United States Patent [19]

Vollhardt

[11] Patent Number: 5,198,004
[45] Date of Patent: Mar. 30, 1993

[54] ACTIVATED CARBON FILTER FOR REMOVING TOXIC SUBSTANCES, E.G., DIOXINS AND FURANS, FROM FLUE GASES PRIOR TO ENTRY INTO THE SMOKESTACK

[75] Inventor: Frohmut Vollhardt, Oberhausen, Fed. Rep. of Germany

[73] Assignee: MAN Gutehoffnungshutte, Oberhausen, Fed. Rep. of Germany

[21] Appl. No.: 805,087

[22] Filed: Dec. 11, 1991

[30] Foreign Application Priority Data

Dec. 12, 1990 [DE] Fed. Rep. of Germany ....... 4039989
Sep. 5, 1991 [DE] Fed. Rep. of Germany ....... 4129483

[51] Int. Cl.$^5$ .................... B01D 53/10; B01D 47/14
[52] U.S. Cl. ...................................... 55/227; 55/233; 55/387; 55/390
[58] Field of Search .................... 55/74, 77, 227, 233, 55/387, 390

[56] References Cited

U.S. PATENT DOCUMENTS

| | | | |
|---|---|---|---|
| 499,156 | 6/1893 | Bate | 55/387 X |
| 1,243,472 | 10/1917 | Wilson | 55/387 X |
| 1,964,794 | 7/1934 | Gilbert | 55/387 X |
| 2,823,765 | 2/1958 | Maslan | 55/74 X |
| 2,886,131 | 5/1959 | Conlisk et al. | 55/74 X |
| 3,556,734 | 1/1971 | Peterson | 55/387 X |
| 3,766,716 | 10/1973 | Ruiz | 55/387 X |
| 3,847,574 | 11/1974 | Fish | 55/387 |
| 4,049,399 | 9/1977 | Teller | 55/74 X |

FOREIGN PATENT DOCUMENTS

| | | |
|---|---|---|
| 2651177 | 5/1978 | Fed. Rep. of Germany . |
| 3434266 | 3/1986 | Fed. Rep. of Germany ........ 55/74 |
| 3841889 | 3/1990 | Fed. Rep. of Germany . |
| 51-059775 | 5/1976 | Japan ................................ 55/387 |
| 54-061073 | 5/1979 | Japan ................................ 55/387 |
| 54-132471 | 10/1979 | Japan ................................ 55/74 |
| 54-152659 | 12/1979 | Japan ................................ 55/74 |
| 55-038174 | 10/1980 | Japan ................................ 55/74 |
| 55-038175 | 10/1980 | Japan ................................ 55/74 |
| 57-136917 | 8/1982 | Japan ................................ 55/74 |
| 782846 | 11/1980 | U.S.S.R. ............................ 55/74 |
| 249464 | 8/1925 | United Kingdom ................. 55/387 |

OTHER PUBLICATIONS

European Search Report for EP 91 12 0627.

*Primary Examiner*—Robert Spitzer
*Attorney, Agent, or Firm*—McGlew and Tuttle

[57] ABSTRACT

The present invention pertains to a device for removing toxic substances, e.g., dioxins and furans, from flue gases, e.g., a refuse incinerator plant, prior to entry into the smokestack. To adsorb these toxic aromatic substances, activated carbon is mixed with 30-40 vol. % water in a filter vessel, and the flue gases in the form of chains of fine bubbles are passed through the activated carbon-water mixture. The filter vessel 1 has a perforated partition 13 acting as a gas distributor. The activated carbon sludge saturated with toxic substances is drawn off and replaced by correspondingly adding dry activated carbon and water.

11 Claims, 3 Drawing Sheets

ACTIVATED CARBON FILTER FOR REMOVING TOXIC SUBSTANCES, E.G., DIOXINS AND FURANS, FROM FLUE GASES PRIOR TO ENTRY INTO THE SMOKESTACK

BACKGROUND OF THE INVENTION

1. Field of the Invention

The present invention pertains to an activated carbon filter for removing toxic substances, e.g., dioxins and furans, from flue gases prior to entry into the smokestack.

In the search for further possibilities, which meet the requirements of the 17th German Federal Air Pollution Prevention Ordinance (17. BIMSchVO) and the Law on the Prevention and Disposal of Wastes (AbfG), an activated carbon filter was developed, in which the hydrocarbon-containing toxic substances re- formed due to cooling effects after the high-temperature combustion section —dioxins and furans—are completely removed from the flue gases after the precipitation of dust before discharge into the atmosphere.

It is now sufficiently known that mechanisms for the destruction of dioxins and furans exist in rotary tubular kilns because of the high oxygen concentration and temperature. However, it cannot be ruled out that due to deposition of these compounds on dust particles in the waste heat boiler and the flue gas cleaning equipment, or due to a new formation of the compounds, the flue gases will still contain these residual amounts of dioxins and furans when discharged into the atmosphere. In relation to the dust discharged from the furnace, the degrees of destruction are very high, but they are again reduced due to the new formation of these toxic substances behind the rotary tubular kiln.

The use of dry activated carbon filters for the final cleaning of the flue gases from refuse incinerator plants has been known from the literature and from practice.

German Offenlegungsschrift No. DE-OS 26,51,117 discloses a process for removing sulfur compounds, especially $H_2S$, from a synthesis gas, in which the mass transfer with the absorbent takes place mainly in the liquid phase, because the mass transfer takes place much more intensely and rapidly in the liquid phase.

It has been known from German Offenlegungsschrift No. DE-OS 38,41,889 that an activated carbon filter stage is installed in front of the clean gas smokestack after the gas cleaning stage of a refuse incinerator plant.

2. Summary and Objects of the Invention

The task of the present invention is to provide a device for removing toxic substances, e.g., dioxins and furans, from flue gases, e.g., in refuse incinerator plants, prior to entry into the clean gas smokestack, which satisfies the existing regulations of the 17. BIM Sch G and equivalent regulations, on the one hand, and with which particularly efficient and rapid mass transfer can be achieved, on the other hand. Complete adsorption of these isomeric hydrocarbons is to be achieved with this device, and the concentration of these toxic substances in the clean gas is to be reduced to below the detection limit.

According to the invention, an activated carbon filter is provided for removing toxic substances such as dioxins and furans, from flue gases prior to the flue gas entering into a smoke stack. The filter comprises a filter vessel with a filter cover or upper wall which is provided with a gas feed pipe and used for metered feeding of activated carbon and with means for metered feeding of water. At least one drainage device is provided in the filter vessel for removal of activated carbon sludge saturated with toxic substances. At an upper part of the filter vessel, at least one gas discharge pipe is provided and an overflow pipe is provided for drawing off saturated activated carbon-water mixture. Horizontal means defining a perforated partition is provided for forming a gas distributor above the outlet of the flue gas feedline. The means defining a perforated partition is preferably provided as a valve tray. The means defining a perforated partition may also be a lass filter with coarse pores. A rotatable mixing device is preferably provided arranged in the vessel bottom. This rotatable mixing device is preferably recessed in the vessel bottom via a sealing connection piece and is connected to a three phase drive. The rotatable mixing device is arranged adjacent the gas outlet of the gas feed pipe and a three-phase drive is fastened above or below the filter cover of the activated carbon filter. The gas feed pipe is preferably connected with a gas check valve arranged in the upper part of the gas feed pipe. Water is passed through the perforated partition via a pipeline into the lower part 15 of the filter vessel.

A control and regulating device is provided for metering activated carbon and water depending on the amount of flue gases to be treated. The control and regulating device also monitors the drawing off of activated carbon water mixtures saturated with toxic gas and dust particles through an overflow arranged in the side wall of the vessel and through a drainage device provided in the vessel bottom. The activated carbon filter may include a filter vessel or a plurality of parallel-connected filter vessels of square, polygonal, or circular cross section.

As a consequence of the rapid and efficient removal process that can be achieved with the activated carbon filter according to the present invention, the dimensions of the activated carbon filter can be kept small compared with filters according to the state of the art.

The device for carrying out the process according to the present invention can also be installed in existing refuse incinerator plants, e.g., after the flue gas scrubber in front of the blower of the clean gas smokestack.

In principle, the activated carbon filter according to the present invention can also be used for the final cleaning of flue gases in other incinerator plants, such as fluidized bed furnaces, low-temperature carbonization plants, etc.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
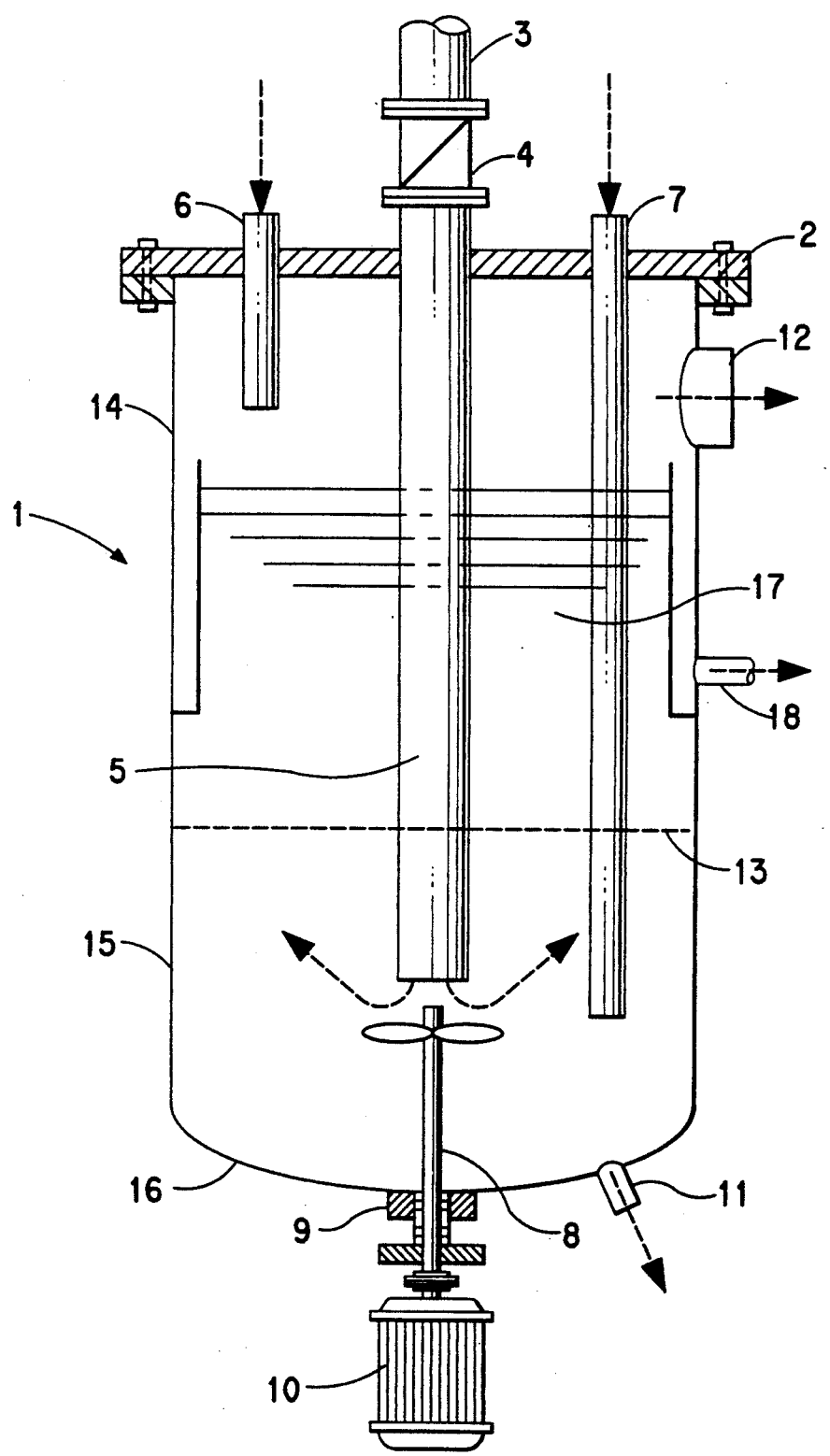
FIG. 1 is a schematic representation of the filter vessel according to the invention.
Figure 2:
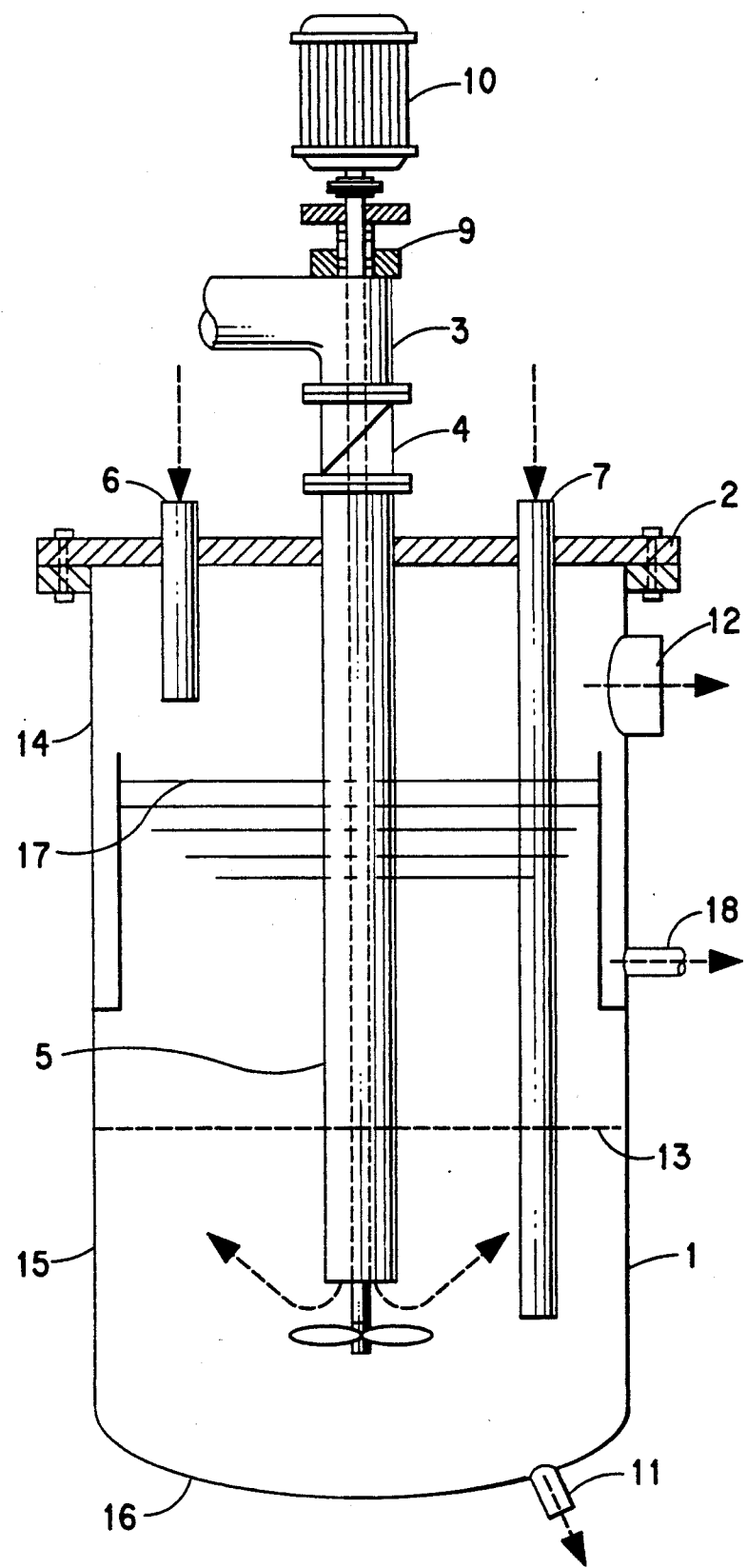
FIG. 2 is another embodiment of the filter vessel according to the invention.
Figure 3:
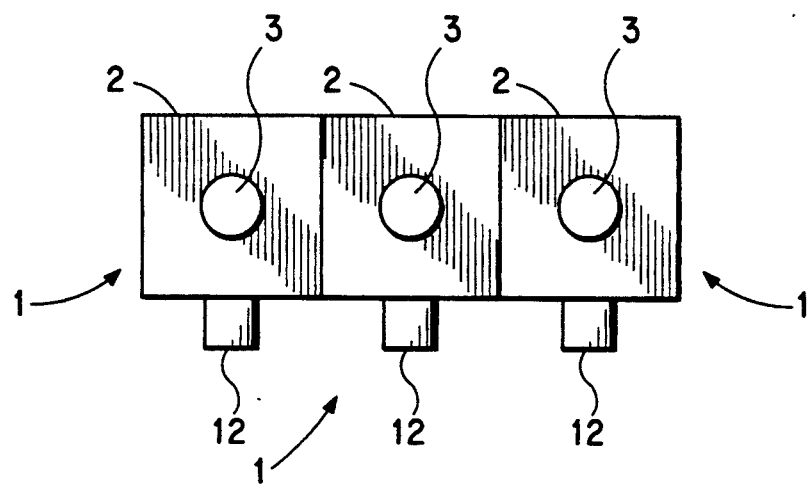
FIGS. 3, 4 and 5 are top views of a plurality of filter vessels having square circular and polygonal cross sections, respectively.
Figure 4:
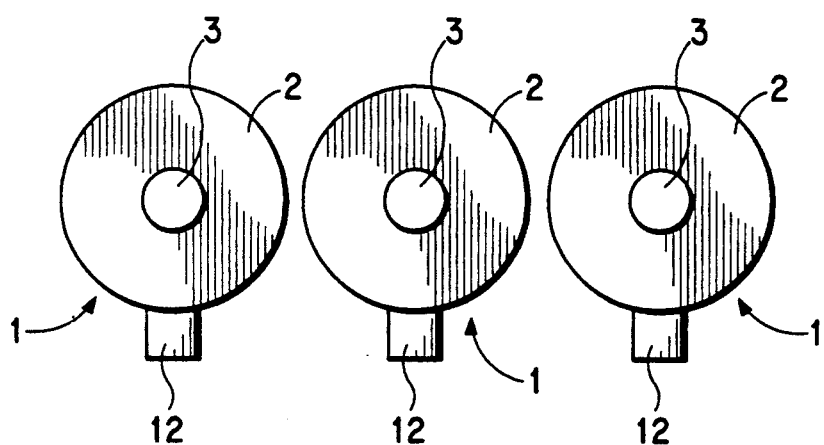
Figure 5:
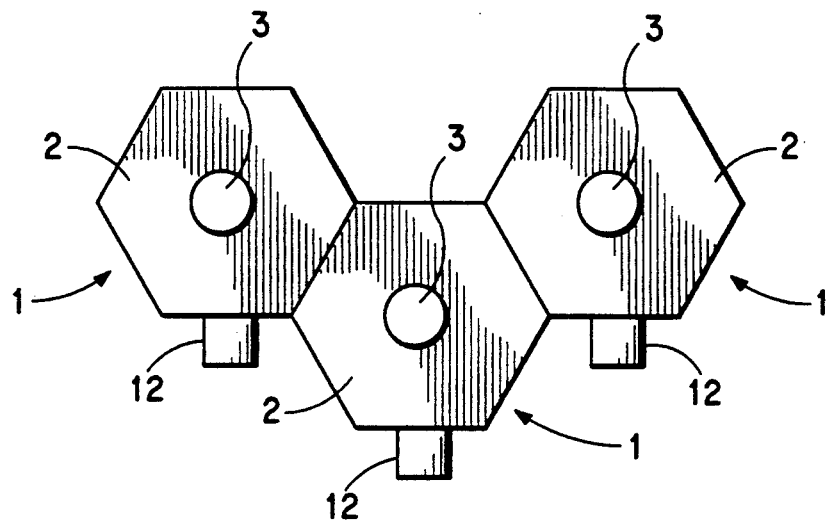

The filter vessel 1 is closed by a filter cover 2. At least one opening for the flue gas feed pipe 3 is provided. Additionally, a feed device 6 for microcrystalline carbon—activated carbon—and a feed device 7 for mixing in water are located on the filter cover or in the upper part of the side wall.

The filter vessel 1 is provided with a drainage device 11 on the vessel bottom 16. On the vessel wall 14 a gastight overflow device 18 is provided (including an overflow wall and an outflow) for the carbon sludge enriched in dioxins and furans. A gas discharge pipe 12 is arranged above the overflow device 18.

A horizontal perforated partition 13 is provided, which improves gas distribution and prevent gas bubbles from forming. The horizontal means defining perforated partition 13 is arranged in the lower zone of the filter vessel 1.

Depending on the gas pressures and also the particle size of the activated carbon used, e.g., commercially available valve trays or glass filters with coarse pores are suitable for use as partitions. The smaller the discharge holes in a valve tray, the smaller is the diameter of the gas bubbles formed, and the less likely are fine bubbles to unite into larger ones. However, the volume throughput naturally decreases with decreasing valve tray hole diameter, so that the type and design of the perforated partition are selected at the time of design of the particular filter.

To bring about an intense and continuous mix 17 of the activated carbon with the water introduced in metered amounts, a rotatable mixing device 8, which is connected to a three-phase drive 10 arranged on the outside via a sealing connection piece 9, is preferably installed in the vessel bottom 16.

A gas check valve 4 is mounted in the gas feed line 3. The gas feed line 3 is provided with a gas outlet 5. The activated carbon 6 is charged into the filter vessel 1 from the top. The mixing water 7 is also introduced from the top or via a pipeline from the cover 2 into the upper part or into the lower part of the filter vessel.

The intense mixing of activated carbon with 30–40 vol. % water takes place in the lower part of the filter vessel 15, and the intended adsorption of the toxic substances, such as dioxins and furans, from the fine flue gas bubbles ascending through the perforated valve tray takes place mainly in the mix 17 in the middle zone of the filter vessel.

While a specific embodiment of the invention has been shown and described in detail to illustrate the application of the principles of the invention, it will be understood that the invention may be embodied otherwise without departing from such principles.

I claim:

1. An activated carbon filter for removing toxic substances from flue gases prior to the glue gas entering a smoke stack, comprising: a filter vessel; a gas feed pipe entering an upper portion of the filter vessel; means for providing a metered feed of activated carbon into the vessel; water feed means for providing a metered feed of water into the vessel; a drainage device provided at a vessel bottom for draining activated carbon sludge saturate with toxic substances; a gas discharge pipe arranged at an upper part of said vessel; overflow means for drawing off saturated activated carbon-water mixture arranged at an upper portion of the vessel; and perforated partition means, positioned above an outlet of said flue gas feed pipe for distributing said gas.

2. An activated carbon filter according to claim 1, wherein said perforated partition means comprises a valve tray.

3. An activated carbon filter according to claim 1, wherein said perforated partition means comprises a glass filter with coarse pores.

4. An activated carbon filter according to claim 1, further comprising rotatable mixing means arranged in a bottom portion of said vessel for providing continuous mixing of activated carbon with water.

5. An activated carbon filter according to claim 4, wherein said rotatable mixing means is recessed in said vessel bottom portion via a sealing connection piece, said rotatable mixing means being connected to a three-phase drive.

6. An activated carbon filter according to claim 4, wherein said rotatable mixing means is arranged adjacent a gas outlet of said gas feed pipe and connected to a three-phase drive, said three-phase drive being fastened above said filter cover of said activated carbon filter.

7. An activated carbon filter according to claim 1, wherein a gas check valve is arranged in an upper part of said gas feed pipe.

8. An activated carbon filter according to claim 1, wherein water is passed through said perforated partition means via a pipeline of said water feed means into a lower portion of said filter vessel.

9. An activated carbon filter according to claim 1, further comprising: control and regulation means for metering activated carbon and water depending upon an amount of flue gas to be treated and for drawing off an activated carbon-water mixture saturated with toxic gas and dust particles through an overflow means, arranged in a sidewall of said vessel and through said drainage device.

10. An activated carbon filter according to claim 1, wherein said activated carbon filter consists of a plurality of parallel-connected filter vessels having one of a square, polygonal and circular cross section.

11. An activated carbon filter according to claim 1, wherein: the toxic substances are dioxins and furans.

* * * * *